United States Patent [19]

Ipposhi et al.

[11] Patent Number: 5,336,918
[45] Date of Patent: Aug. 9, 1994

[54] SEMICONDUCTOR PRESSURE SENSOR AND METHOD OF FABRICATING THE SAME

[75] Inventors: Takashi Ipposhi; Tadashi Nishimura, both of Hyogo, Japan

[73] Assignee: Mitsubishi Denki Kabushiki Kaisha, Tokyo, Japan

[21] Appl. No.: 51,914

[22] Filed: Apr. 26, 1993

[30] Foreign Application Priority Data

Sep. 9, 1992 [JP] Japan ................. 4-240625

[51] Int. Cl.⁵ ................. H01L 29/84; H01L 29/06
[52] U.S. Cl. ................. 257/419; 257/49; 257/66; 257/537; 257/635
[58] Field of Search ............ 257/419, 49, 66, 487, 257/536–538, 619, 620, 635, 638, 647

[56] References Cited

U.S. PATENT DOCUMENTS 4,396,930  8/1983  Mizutani ................. 257/66
4,822,752  4/1989  Sugahara et al. ................. 437/174

FOREIGN PATENT DOCUMENTS 56-164582  12/1981  Japan .
60-154576  8/1985  Japan .
4-76956  3/1992  Japan .
4-76959  3/1992  Japan .

Primary Examiner—Mark V. Prenty
Attorney, Agent, or Firm—Lowe, Price, LeBlanc & Becker

[57] ABSTRACT

Disclosed herein is a semiconductor pressure sensor which can improve a withstand voltage across piezoresistance and interconnection layers and a semiconductor substrate. In this semiconductor pressure sensor, a plurality of dot seeds, which are regions for serving as seed crystals for growing monocrystals, are arranged to enclose the piezoresistance, and the interconnection layer is formed to pass through a clearance between adjacent ones of the dot seeds.

21 Claims, 17 Drawing Sheets

SEMICONDUCTOR PRESSURE SENSOR AND METHOD OF FABRICATING THE SAME

BACKGROUND OF THE INVENTION

Field of the Invention

The present invention relates to a semiconductor pressure sensor and a method of fabricating the same, and more particularly, it relates to a semiconductor pressure sensor having an SOI (silicon on insulator) structure which is formed by laterally growing a monocrystal from a seed crystal on an insulating film, and a method of fabricating the same.

Description of the Background Art

Generally known is a semiconductor pressure sensor having an SOI structure, which is fabricated by forming a monocrystal layer by laterally growing a monocrystal from a seed crystal on an insulating film, and preparing a piezoresistance having piezo characteristics from the monocrystal layer. The method of forming a monocrystal layer by laterally growing a monocrystal from a seed crystal on an insulating layer is called lateral seeding. FIG. 25 is a plan view showing a conventional semiconductor pressure sensor having an SOI structure, and FIG. 26 is a sectional view, showing the semiconductor pressure sensor, taken along the line X—X in FIG. 25. Referring to FIGS. 25 and 26, the conventional semiconductor pressure sensor comprises a monocrystal silicon substrate 101, a diaphragm 108 which is formed on a prescribed region of the back surface of the monocrystal silicon substrate 101, a silicon oxide film 102 which is formed on a prescribed region of the major surface of the monocrystal silicon substrate 101, dot seeds 103 which are formed on other regions of the major surface of the monocrystal silicon substrate 101 provided with no silicon oxide film 102 for serving as seed crystals, piezoresistances 104 of monocrystal silicon having piezo characteristics which are formed on prescribed regions of the silicon oxide film 102, an interlayer insulating film 105 of a CVD silicon oxide film which is formed to cover the monocrystal silicon substrate 101 and the piezoresistances 104 with contact holes 106 provided on prescribed regions of the piezoresistances 104, interconnection layers 107 which are formed to be electrically connected to the piezoresistances 104 through the contact holes 106 and to extend along the interlayer insulating film 105, and a protective film 109 of plasma nitride or silicon oxide which is formed to cover the interlayer insulating film 105.

Such a conventional semiconductor pressure sensor having an SOI structure is operable under a high temperature since no p-n junctions are employed for electrically separating the piezoresistances 104 from each other and from the monocrystal silicon substrate 101. Further, it is known that the diaphragm 108 can be accurately formed with a small thickness, as shown in FIG. 26. This semiconductor pressure sensor is disclosed in Japanese Patent Laying-Open No. 56-164582 (1981), for example.

A method of fabricating the conventional semiconductor pressure sensor is now described with reference to FIGS. 25 and 26. The semiconductor pressure sensor having an SOI structure shown in FIG. 26 can be fabricated by various methods. Among such methods, laser recrystallization is effective for forming such an SOI structure of the semiconductor pressure sensor, since this method is capable of forming a high-quality SOI structure at a low cost.

In the method of forming an SOI structure, a silicon oxide film 102 of about 1 $\mu$m in thickness is first formed by thermal oxidation on a prescribed region of a major surface of a (100) monocrystal silicon substrate 101, for example. Due to such formation of the silicon oxide film 102, dot seeds 103 are formed on the major surface of the monocrystal silicon substrate 101 for serving as seed crystal regions. Then, a non-monocrystal silicon layer (not shown) of about 0.6 $\mu$m in thickness is formed on the silicon oxide film 102. A laser beam is applied to the non-monocrystal silicon layer for melting the same and laterally growing monocrystal layers from the dot seeds 103 on the silicon oxide layer 102. The as-grown monocrystal layers (not shown) are patterned and a prescribed impurity is introduced into the patterned monocrystal layers, to form piezoresistances 104. An interlayer insulating film 105 of silicon oxide having a thickness of about 0.6 $\mu$m is formed by CVD to cover the piezoresistances 104 and the monocrystal silicon substrate 101. Contact holes 106 are formed in regions of the interlayer insulating film 105 positioned on the piezoresistances 104. Interconnection layers 107 of aluminum are formed to be electrically connected to the piezoresistances 104 through the contact holes 106 and to extend along the interlayer insulating film 105. Thereafter a protective film 109 of plasma nitride or silicon oxide is formed to cover the overall surface. Then, a diaphragm 108 is formed on the back surface of the monocrystal silicon substrate 101. Thus, the conventional semiconductor pressure sensor is formed.

As described above, monocrystal layers are formed on the silicon oxide film 102 through the dot seeds 103 serving as seed crystals, to define the piezoresistances 104 by the monocrystal layers in the conventional semiconductor pressure sensor. Then, the interconnection layers 107 are formed to be electrically connected to the piezoresistances 104. In the conventional semiconductor pressure sensor, however, plan positions of the dot seeds 103 and the interconnection layers 107 are overlapped to cause the following problems: When withstand voltages across the monocrystal silicon substrate 101 and the interconnection and piezoresistance layers 107 and 104 were measured in practice, only low values of about several 100 V were obtained. Further, dielectric breakdown was caused in regions where the plan positions of the dot seeds 103 and the interconnection layers 107 were overlapped with each other. FIG. 27 is a partially enlarged plan view illustrating a part A of the semiconductor pressure sensor shown in FIG. 25. Referring to FIG. 27, plan positions of the interconnection layers 107 and the dot seeds 103 are generally partially overlapped with each other in the conventional semiconductor pressure sensor as shown at B, since such plan positions are not in the least taken into consideration. As viewed along the section of a region where the interconnection layers 107 and the dot seeds 103 are overlapped with each other, only portions of the interlayer insulating film 105 of CVD silicon oxide are present between the dot seeds 103 and the interconnection layers 107, as shown in FIG. 26. Since the thickness (about 0.6 $\mu$m) of the interlayer insulating film 105 is smaller than that (about 1.0 $\mu$m) of the silicon oxide film 102 and the CVD silicon oxide film forming the interlayer insulating film 105 has a lower withstand voltage as compared with the thermal oxidation film forming the silicon oxide film 102, dielectric breakdown is easily caused in the regions where the interconnection layers 107 and the dot seeds 103 are overlapped with each other. Thus, it is impossible to improve withstand voltage characteristics across the interconnection and piezoresistance layers 107 and 104 and the monocrystal silicon substrate 101.

As hereinabove described, it is possible to accurately form a diaphragm with a small thickness in a semiconductor pressure sensor having an SOI structure. This is because the silicon oxide film 102 provided under the piezoresistances 104 serves as an etching stopper for silicon in formation of the diaphragm 108. In the conventional semiconductor pressure sensor shown in FIG. 25, however, the dot seeds 103 are formed inside a region located above the diaphragm 108, and hence silicon forming the dot seeds 103 is inevitably influenced by etching of the diaphragm 108 as shown in FIG. 28. As the result, it is difficult to form a homogeneous diaphragm with a small thickness.

SUMMARY OF THE INVENTION

An object of the present invention is to improve the withstand voltage across a semiconductor substrate and piezoresistance and interconnection layers in a semiconductor pressure sensor.

Another object of the present invention is to obtain a homogeneous diaphragm with a small thickness in a semiconductor pressure sensor.

Still another object of the present invention is to readily fabricate a semiconductor device which can improve the withstand voltage across a semiconductor substrate and interconnection and piezoresistance layers in a method of fabricating a semiconductor pressure sensor.

In a first aspect of the present invention, a semiconductor pressure sensor comprises a monocrystal semiconductor substrate having a major surface, a first insulating layer which is formed on a prescribed region of the major surface of the semiconductor substrate, a plurality of seed crystal regions which are formed on other regions of the major surface of the monocrystal semiconductor substrate provided with no first insulating layer, a piezoresistance layer, provided on a prescribed region of the first insulating layer, prepared from a monocrystal layer which is formed by laterally growing monocrystals from the seed crystal regions on the first insulating layer, a second insulating layer, having an opening on a prescribed region of the piezoresistance layer, which is formed to cover the piezoresistance layer and the first insulating layer, and an interconnection layer which is formed on the second insulating layer to be electrically connected to the piezoresistance layer through the opening. The plurality of seed crystal regions are separated from each other at prescribed intervals to enclose the piezoresistance layer, while the interconnection layer is formed to pass through a clearance between adjacent ones of the seed crystal regions in plan position.

In operation, the interconnection layer which is electrically connected to the piezoresistance layer is formed to pass through a clearance between adjacent ones of the seed crystal regions in plan position, whereby linear distances between the interconnection layer and the seed crystal regions are increased as compared with those having overlapped plan positions. Thus, the withstand voltage is improved.

In another aspect of the present invention, a semiconductor pressure sensor comprises a monocrystal semiconductor substrate having a major surface, a first insulating layer which is formed on a prescribed region of the major surface of the monocrystal semiconductor substrate, a seed crystal region which is formed on another region of the major surface of the monocrystal semiconductor substrate provided with no first insulating layer, a piezoresistance layer, provided on a prescribed region of the first insulating layer, prepared from a monocrystal layer which is formed by laterally growing a monocrystal from the seed crystal region on the first insulating layer, a second insulating layer, having an opening on a prescribed region of the piezoresistance layer, which is formed to cover the piezoresistance layer and the first insulating layer, and an interconnection layer which is formed on the second insulating layer to be electrically connected to the piezoresistance layer through the opening. The seed crystal region is formed on a prescribed region around the piezoresistance layer not to enclose the piezoresistance layer, while the interconnection layer is formed on a region not enclosed by the seed crystal region.

In operation, the seed crystal region is formed on a prescribed region around the piezoresistance layer not to enclose the piezoresistance layer and the interconnection layer is formed on a region not enclosed by the seed crystal region, whereby plan positions of the seed crystal region and the interconnection layer are not overlapped with each other while a sufficient space is attained therebetween. Thus, the withstand voltage across the interconnection layer and the seed crystal region is improved.

In still another aspect of the present invention, a semiconductor pressure sensor comprises a monocrystal semiconductor substrate having a major surface, a first insulating layer which is formed on a prescribed region of the major surface of the monocrystal semiconductor substrate, a seed crystal region which is formed on another region of the major surface of the monocrystal semiconductor substrate provided with no first insulating layer, a piezoresistance layer, provided on a prescribed region of the first insulating layer, prepared from a monocrystal layer which is formed by laterally growing a monocrystal from the seed crystal region on the first insulating layer, a second insulating layer which is formed on the seed crystal region and the first insulating layer to enclose the piezoresistance layer, a third insulating layer, having an opening on a prescribed region of the piezoresistance layer, which is formed on the piezoresistance layer and the second insulating layer, and an interconnection layer which is formed on the third insulating layer to be electrically connected to the piezoresistance layer through the opening.

In operation, the second insulating layer is formed on the first insulating layer to enclose the piezoresistance layer provided on the first insulating layer and the third insulating layer is formed on the second insulating layer and the piezoresistance layer while the interconnection layer is formed on the third insulating layer to be electrically connected to the piezoresistance layer, whereby the withstand voltage is improved by virtue of the second insulating layer even if plan positions of the interconnection layer and the seed crystal region are overlapped with each other similarly to the prior art, since the second and third insulating layers are interposed between the overlapped regions of the interconnection layer and the seed crystal region.

In a further aspect of the present invention, a semiconductor pressure sensor comprises a monocrystal semiconductor substrate having front and back surfaces, a diaphragm which is formed on a prescribed region of the back surface of the monocrystal substrate, a first insulating layer which is formed on the front surface of the monocrystal semiconductor substrate at least in a region corresponding to the region provided with the diaphragm, a seed crystal region which is formed on another region of the front surface of the monocrystal semiconductor substrate provided with no first insulating layer and outside the region provided with the diaphragm, a piezoresistance layer, provided on the first insulating layer to be located above the region provided with the diaphragm, prepared from a monocrystal layer which is formed by laterally growing a monocrystal from the seed crystal region on the first insulating layer, a second insulating layer which is formed to cover the piezoresistance layer and the first insulating layer with an opening provided on a prescribed region of the piezoresistance layer, and an interconnection layer which is formed on the second insulating layer to be electrically connected to the piezoresistance layer through the opening.

In operation, the seed crystal region is formed in the region outside that provided with the diaphragm, whereby the seed crystal region is not influenced by etching for forming the diaphragm and it is possible to form a homogeneous diaphragm having a small thickness.

In a further aspect of the present invention, a method of fabricating a semiconductor pressure sensor comprises a step of forming a first insulating layer on a prescribed region of a major surface of a monocrystal semiconductor substrate while forming a seed crystal region on another region of the major surface of the monocrystal semiconductor substrate provided with no first insulating layer, a step of forming a monocrystal layer on the first insulating layer by laterally growing a monocrystal from the seed crystal region on the first insulating layer, a step of forming a second insulating layer by thermally oxidizing a prescribed region of the monocrystal layer, a step of introducing an impurity into a prescribed region of the monocrystal layer, a step of forming a third insulating layer having an opening on the second insulating layer and the monocrystal layer being supplied with the impurity, and a step of forming an interconnection layer on the third insulating layer to be electrically connected to the monocrystal layer being supplied with the impurity in the opening.

In operation, the monocrystal layer is formed on the first insulating layer by laterally growing a monocrystal from the seed crystal region on the first insulating layer, the second insulating layer is formed by thermally oxidizing a prescribed region of the monocrystal layer, an impurity is introduced into a prescribed region of the monocrystal layer, the third insulating layer is formed on the second insulating layer and the monocrystal layer supplied with the impurity, and the interconnection layer is formed on the third insulating layer to be electrically connected to the monocrystal layer being supplied with the impurity, whereby it is possible to readily form a semiconductor pressure sensor so that the withstand voltage is improved as compared with the prior art by virtue of the second insulating layer even if plan positions of the interconnection layer and the seed crystal region are overlapped with each other since the second and third insulating layers are interposed between the interconnection layer and the monocrystal semiconductor substrate in the overlapped regions.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

Figure 1:
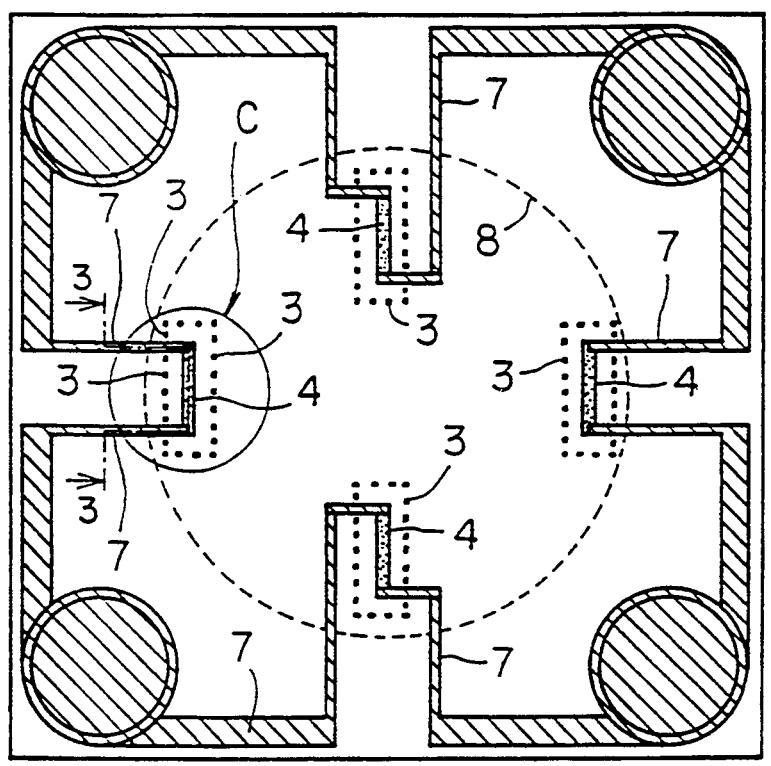
FIG. 1 is a general plan view showing a semiconductor pressure sensor according to a first embodiment of the present invention.
Figure 2:
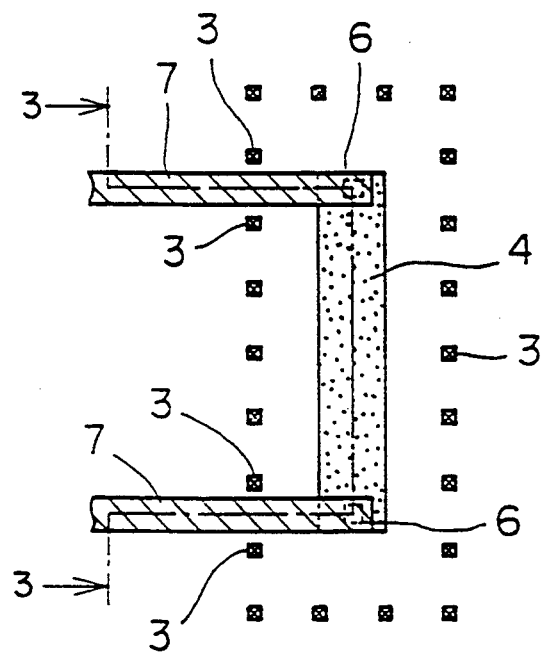
FIG. 2 is a partially enlarged plan view illustrating a part C of the semiconductor pressure sensor shown in FIG. 1.
Figure 3:
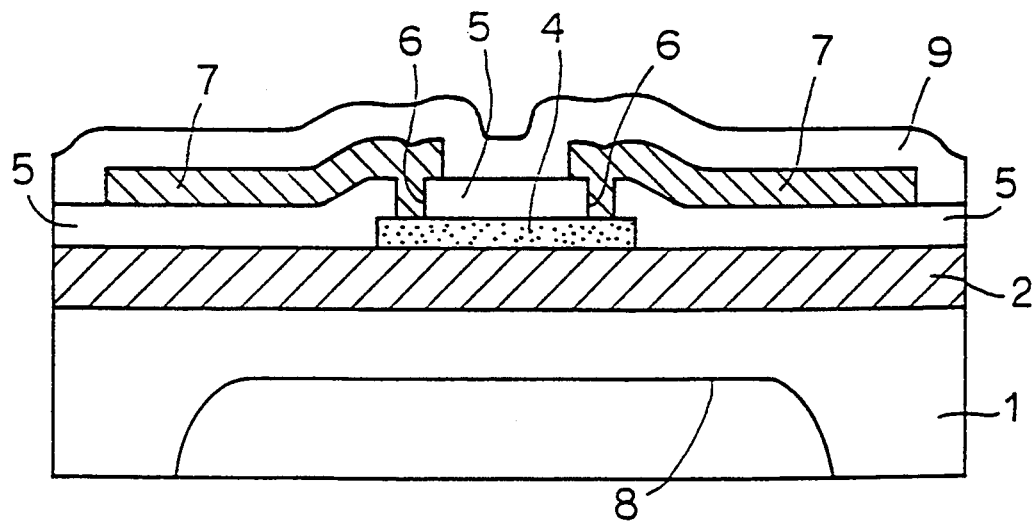
FIG. 3 is a sectional view showing the semiconductor pressure sensor according to the first embodiment taken along the lines X—X in FIGS. 1 and 2.

Referring to FIGS. 1 to 3, a semiconductor pressure sensor according to a first embodiment of the present invention comprises a monocrystal silicon substrate 1, a silicon oxide film 2 of about 1.0 $\mu$m in thickness which is formed on a prescribed region of the monocrystal silicon substrate 1 by thermal oxidation, dot seeds 3 (see FIGS. 1 and 2) which are formed on other regions of the monocrystal silicon substrate 1 provided with no silicon oxide film 2 at prescribed intervals for serving as seed crystals, piezoresistances 4 of about 0.6 $\mu$m in thickness having piezo characteristics which are formed on prescribed regions of the silicon oxide film 2, an interlayer insulating film 5 of silicon oxide having a thickness of about 0.6 $\mu$m which is formed to cover the piezoresistances 4 and the silicon oxide film 2 with contact holes 6 provided on prescribed regions of the piezoresistances 4, interconnection layers 7 which are formed to be electrically connected to the piezoresistances 4 through the contact holes 6 and to extend along the interlayer insulating film 5, a protective film 9 of silicon oxide or plasma nitride which is formed to cover the interconnection layers 7 and the interlayer insulating film 5, and a diaphragm 8 which is formed on a back surface portion of the monocrystal silicon substrate 1 located under the region provided with the piezoresistances 4.

Figure 26:
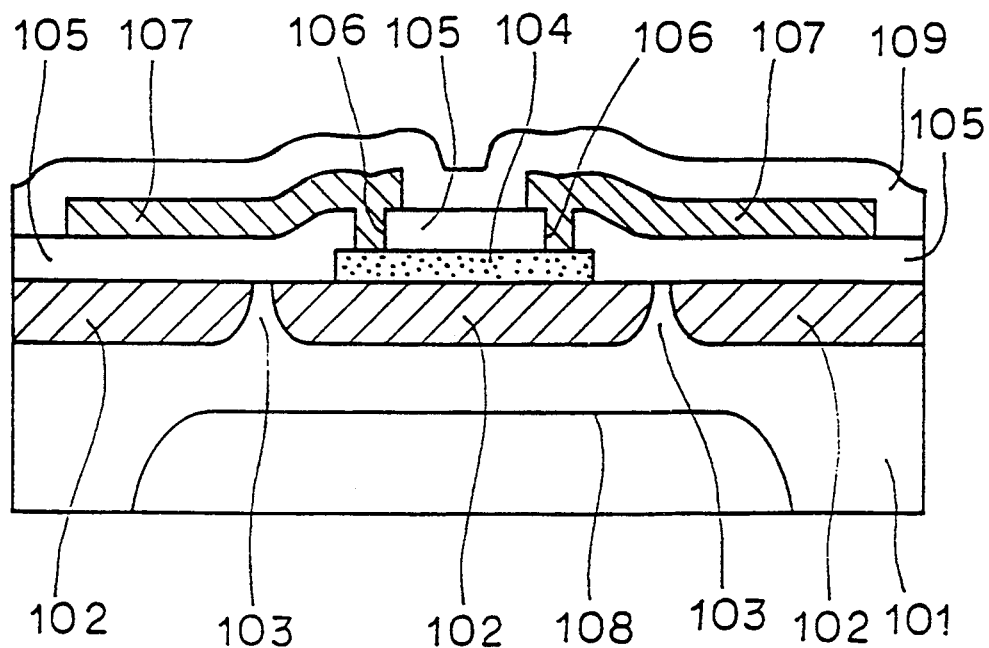
FIG. 26 is a sectional view of the semiconductor pressure sensor, taken along the line X—X in FIG. 25.
Figure 27:
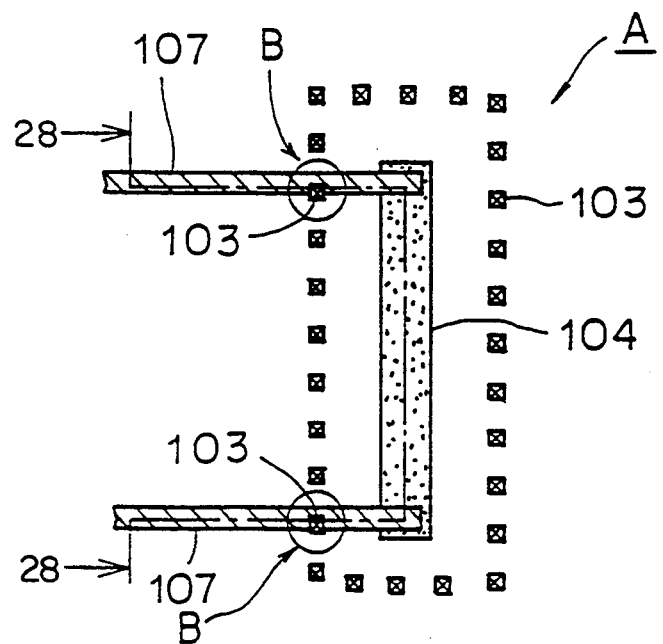
FIG. 27 is a partially enlarged sectional view showing a part A of the semiconductor pressure sensor shown in FIG. 25.
Figure 28:
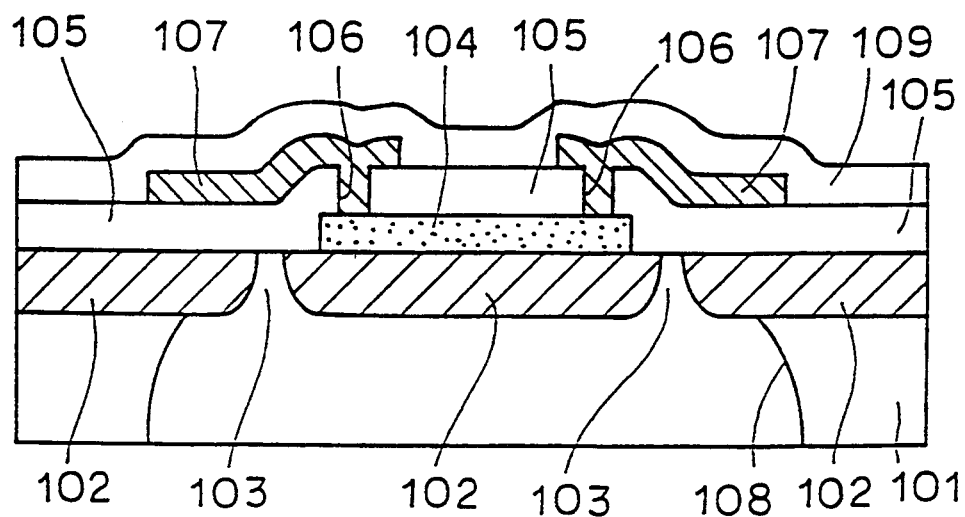
FIG. 28 is a sectional view for illustrating problems of the conventional semiconductor pressure sensor.

According to the first embodiment, the interconnection layers 7 are arranged to pass through clearances between adjacent ones of the dot seeds 3, as shown in FIGS. 1 and 2. Due to such structure, linear distances between the interconnection layers 7 and those of the dot seeds 3 which are closest thereto are increased as compared with the conventional semiconductor pressure sensor shown in FIGS. 26 and 27. Thus, withstand voltages across the dot seeds 3 and the interconnection layers 7 can be improved as compared with the conventional semiconductor pressure sensor shown in FIGS. 26 and 27. The dot seeds 3, which are about 1.5 to 5 $\mu$m□ in size, are arranged at intervals of about 15 to 30 $\mu$m. Thus, it is possible to readily make the interconnection layers 7 pass through the clearances between adjacent ones of the dot seeds 3 by reducing the line widths thereof, thereby avoiding planar overlapping of the dot seeds 3 and the interconnection layers 7.

Figure 4:
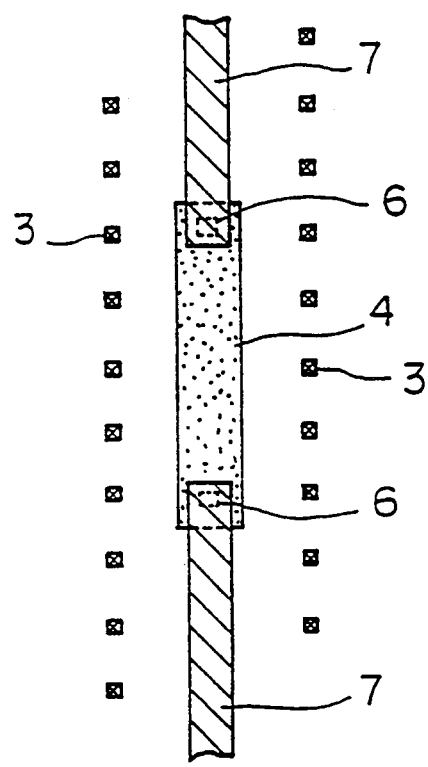
FIG. 4 is a schematic plan view showing a semiconductor pressure sensor according to a second embodiment of the present invention.

Referring to FIG. 4, a semiconductor pressure sensor according to a second embodiment of the present invention comprises dot seeds 3, which are arranged to enclose no piezoresistance 4, dissimilarly to the first embodiment shown in FIG. 2. In this case, it is possible to further increase linear distances between interconnection layers 7 and the dot seeds 3, thereby further improving withstand voltages across the same. In more concrete terms, the dot seeds 3 are arranged to hold each piezoresistance 4 along its longer sides, while the interconnection layers 7 are drawn out from shorter sides of the piezoresistance 4.

Figure 5:
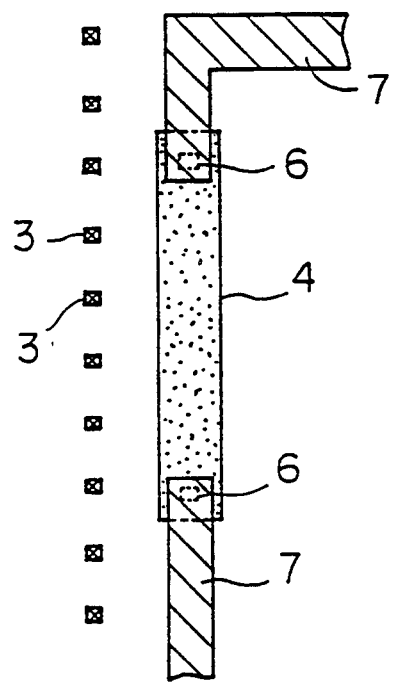
FIG. 5 is a schematic plan view showing a semiconductor pressure sensor according to a third embodiment of the present invention.

Referring to FIG. 5, a semiconductor pressure sensor according to a third embodiment of the present invention comprises dot seeds 3, which are arranged only on one side along the longitudinal direction of each piezoresistance 4. Also in this case, it is possible to increase linear distances between interconnection layers 7 and the dot seeds 3, similarly to the second embodiment shown in FIG. 4. Thus, withstand voltages across the interconnection layers 7 and the dot seeds 3 can be improved as compared with the prior art. According to the third embodiment, further, patterns of the interconnection layers 7 are increased in degree of freedom as compared with the second embodiment shown in FIG. 4.

Figure 6:
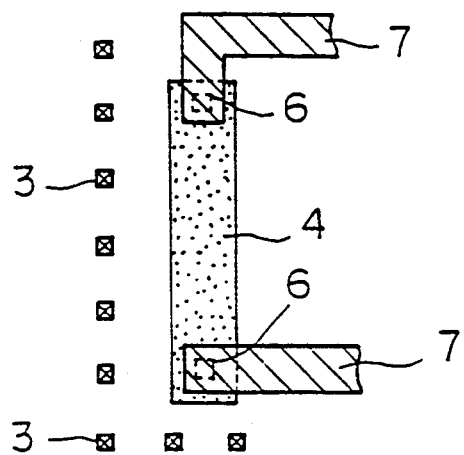
FIG. 6 is a schematic plan view showing a semiconductor pressure sensor according to a fourth embodiment of the present invention.

Referring to FIG. 6, a semiconductor pressure sensor according to a fourth embodiment of the present invention comprises dot seeds 3, which are arranged in the form of an L with respect to each piezoresistance 4. In this case, it is possible to advantageously reduce the lengths of regions to be monocrystallized when laser recrystallization is performed through the dot seeds 3 serving as seed crystals, as hereinafter described.

Description is now made on a method of growing monocrystal layers for forming piezoresistances 4 on a silicon oxide film 2 (see FIG. 3) with the dot seeds 3 as described with reference to the first to fourth embodiments. Employed in the first to fourth embodiments is laser recrystallization, which is adapted to grow a monocrystal silicon layer from a seed crystal (dot seed 3) by applying a laser beam to a non-monocrystal silicon layer and melting the same. In order to grow such a monocrystal silicon layer, it is necessary to control temperature distribution in the melted silicon by a method such as a well-known method of using antireflection coating stripes. This method is widely employed due to easiness of the process and unnecessity for a laser beam aligning mechanism. Such a method is disclosed in detail in U.S. Pat. No. 4,822,752, for example.

Figure 7:
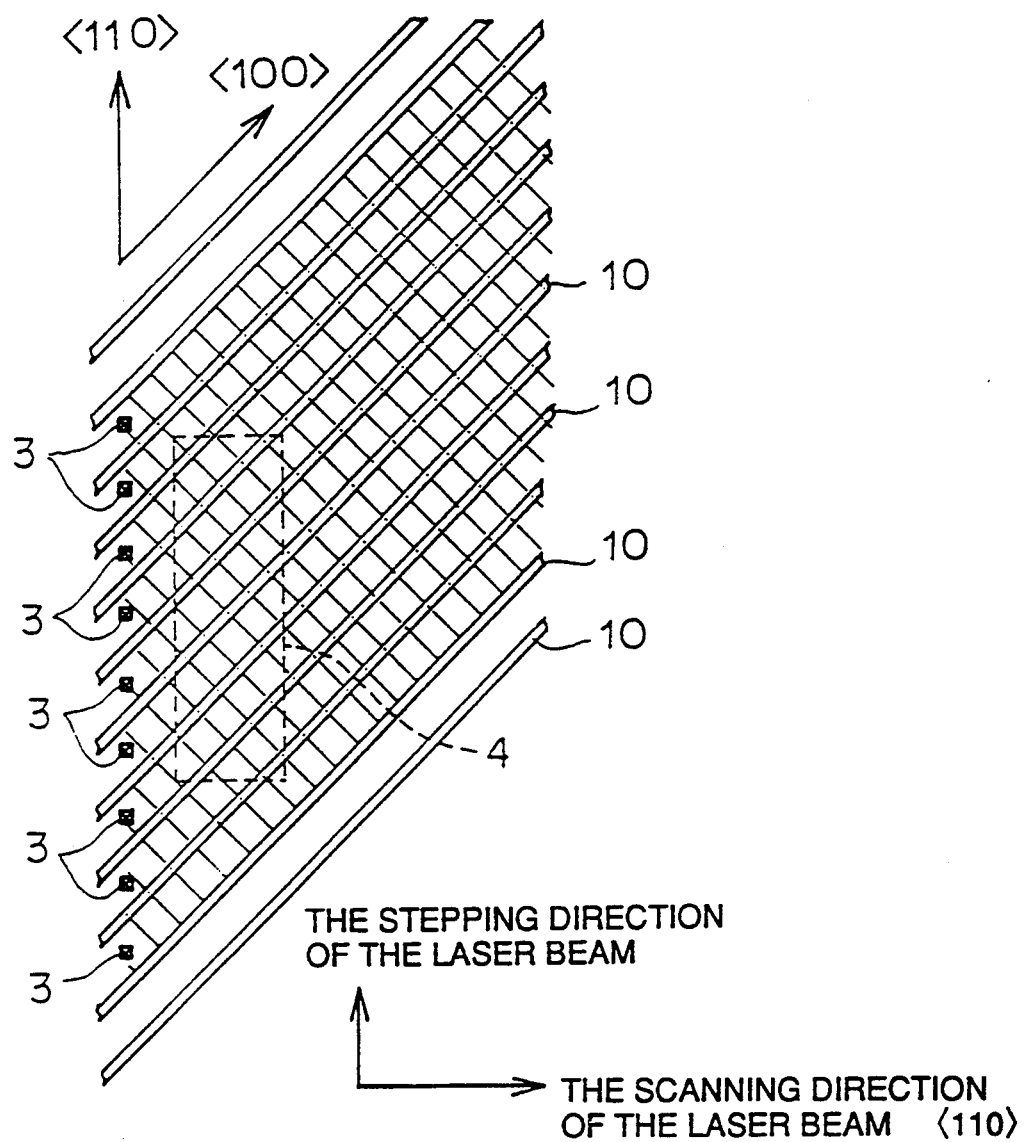
FIG. 7 is a schematic plan view for illustrating laser recrystallization, using antireflection coating stripes, which is employed in the present invention.

FIG. 7 is a schematic plan view for illustrating the laser recrystallization using antireflection coating stripes. With reference to FIG. 7, the following description is made with respect to a semiconductor substrate which is prepared from a (100) monocrystal silicon substrate provided with dot seeds 3. When antireflection coating stripes 10 are formed along the <100> direction, lateral seeding (lateral growth of monocrystals) in laser recrystallization continues for the longest period. Thus, monocrystal silicon of a large area is obtained. In this case, a laser beam is applied to scan and step along the <100> direction, thereby annealing the overall surface. As the result, a monocrystal layer which is directionally identical to the (100) monocrystal silicon substrate is formed on a region enclosed by the antireflection coating stripes 10 provided along the dot seeds 3, as shown by slant lines in FIG. 7. This monocrystal layer is inclined in the <100> direction with respect to the <110> direction, as shown in FIG. 7. In order to form a piezoresistance 4 having longer sides along the <110> direction, therefore, it is necessary to provide the dot seeds 3 below a region to be provided with the piezoresistance 4.

Figure 8:
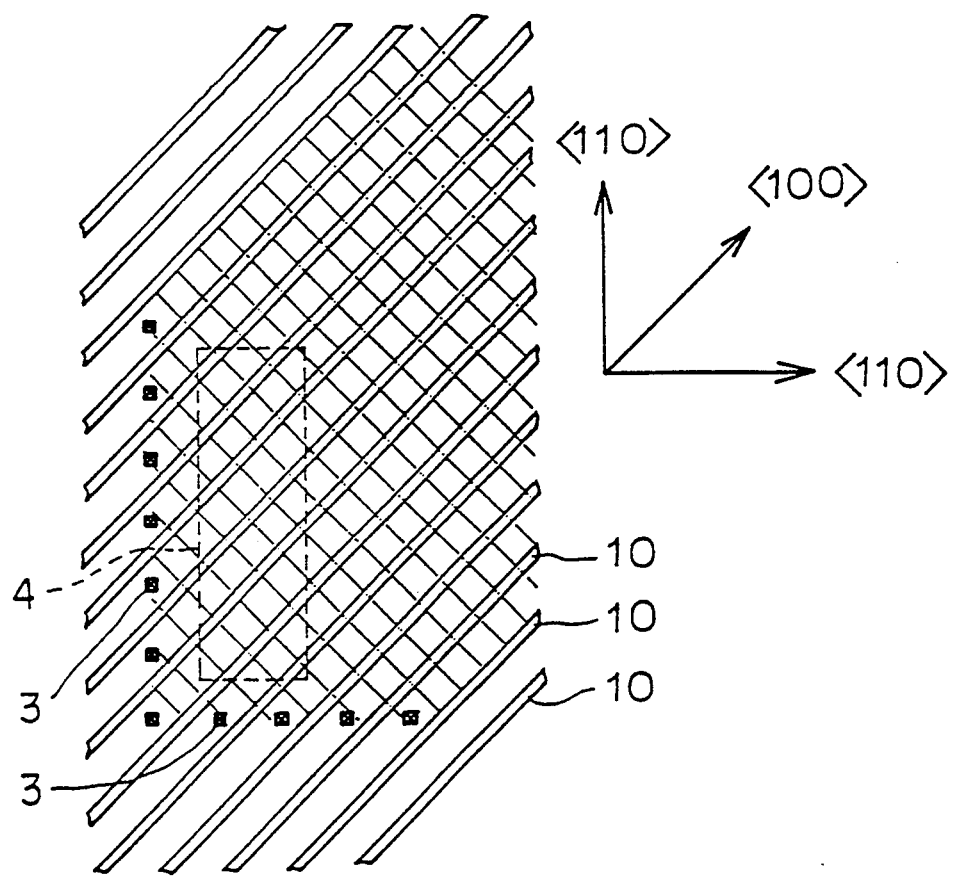
FIG. 8 is a schematic plan view showing a method of growing monocrystals by laser recrystallization using dot seeds arranged in the form of an L according to the fourth embodiment shown in FIG. 6.

FIG. 8 is a schematic plan view showing a case of forming a monocrystal layer through the dot seeds 3 according to the fourth embodiment, which are arranged in the form of an L. When the dot seeds 3 are thus arranged in the form of an L, it is possible to reduce the length along the feed direction of the laser beam as compared with the case shown in FIG. 7. As the result, it is possible to reduce the laser application time thereby reducing the step.

Figure 9:
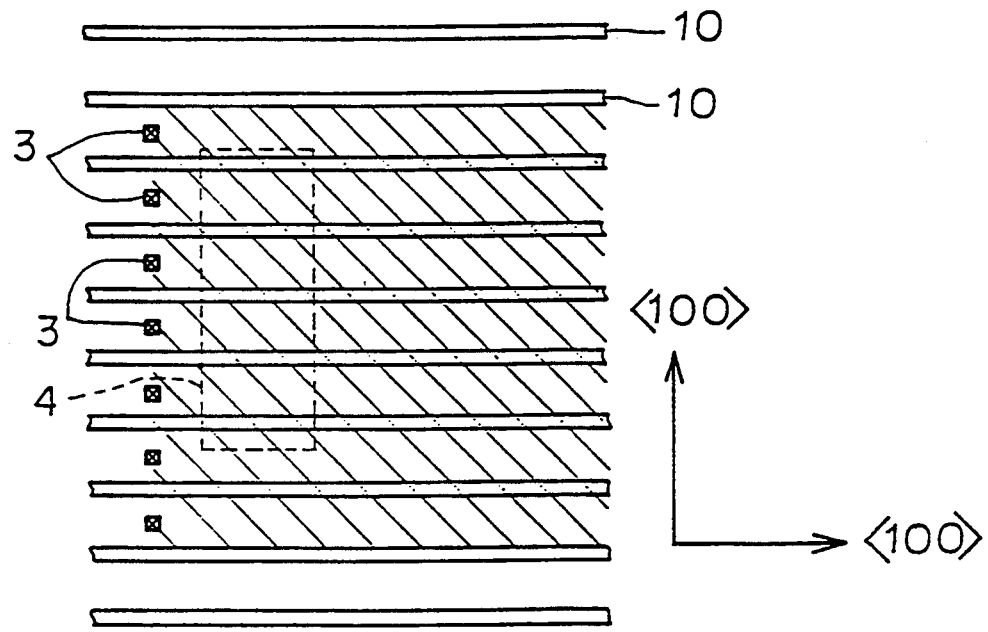
FIG. 9 is a schematic plan view for illustrating a process of growing monocrystals by laser recrystallization with respect to a piezoresistance 4 having longer sides along the <100> direction.

FIG. 9 is a schematic plan view for illustrating laser recrystallization through dot seeds 3 which are arranged along the <100> direction. The operation principle of a piezoresistance 4 is based on such a piezoresistance effect that its resistance value changes upon application of stress. As to such a piezoresistance effect, crystal orientation for maximizing the effect varies with the conductivity (n and p) types. In a silicon member having a (100) plane, the piezoresistance effect is maximized when a current flows along the <100> direction in the case of n-type silicon, while the greatest piezoresistance effect appears when a current flows along the <110> direction in the case of p-type silicon. Thus, it is necessary to decide arrangement of the piezoresistance 4 in consideration of its conductivity type. Referring to FIG. 9, the piezoresistance 4 is arranged along the <100> direction, and the dot seeds 3 are also arranged along the <100> direction in correspondence thereto.

Figure 10:
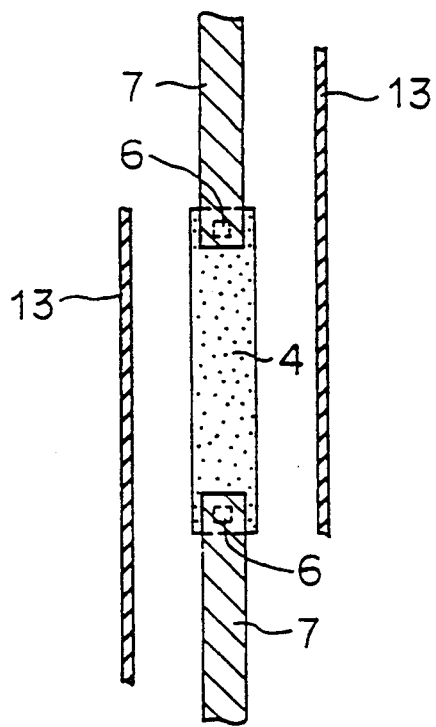
FIG. 10 is a schematic plan view showing a semiconductor pressure sensor according to a fifth embodiment of the present invention.

Referring to FIG. 10, a semiconductor pressure sensor according to a fifth embodiment of the present invention comprises a pair of linear seeds 13 which are arranged along longer sides of each piezoresistance 4. In this case, it is possible to increase spaces between interconnection layers 7 and the linear seeds 13, thereby improving withstand voltages across the same.

Figure 11:
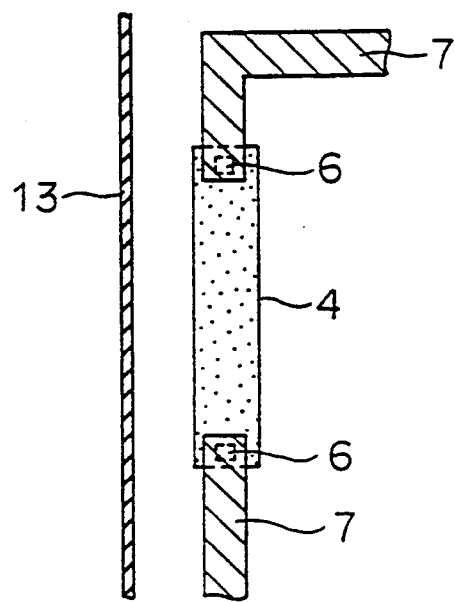
FIG. 11 is a schematic plan view showing a semiconductor pressure sensor according to a sixth embodiment of the present invention.
Figure 12:
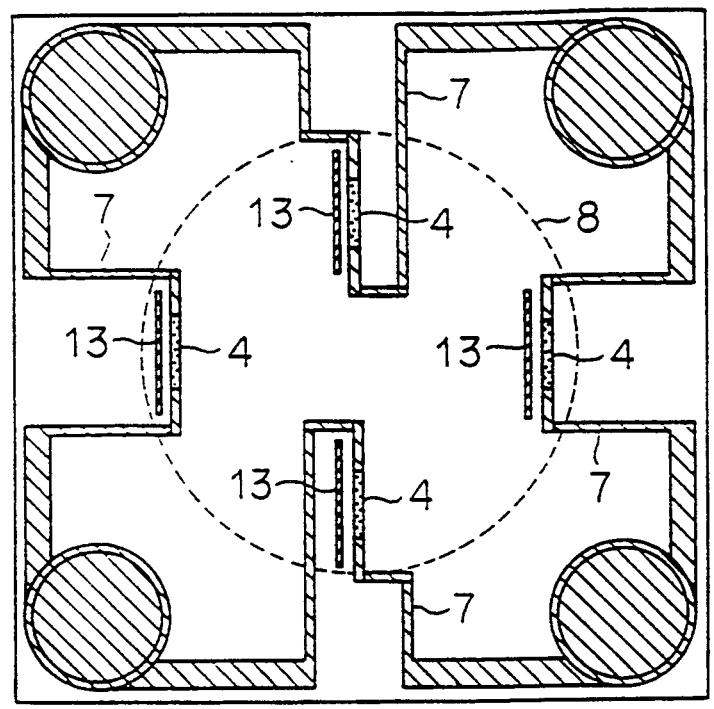
FIG. 12 is a general plan view showing the semiconductor pressure sensor according to the sixth embodiment shown in FIG. 1.

Referring to FIG. 11, a semiconductor pressure sensor according to a sixth embodiment of the present invention comprises a single linear seed 13 which is arranged along a longer side of each piezoresistance 4. Referring to FIG. 12, it is necessary to arrange all such linear seeds 13 longitudinally along the same sides of piezoresistances 4 when the former are provided along single longer sides of the latter, in correspondence to unidirectional scanning of a laser beam which is employed for laser crystallization through the linear seeds 13. Also in the third and fourth embodiments shown in FIGS. 5 and 6, therefore, it is necessary to arrange the dot seeds 3 on the same single sides of the respective piezoresistances 4.

Figure 13:
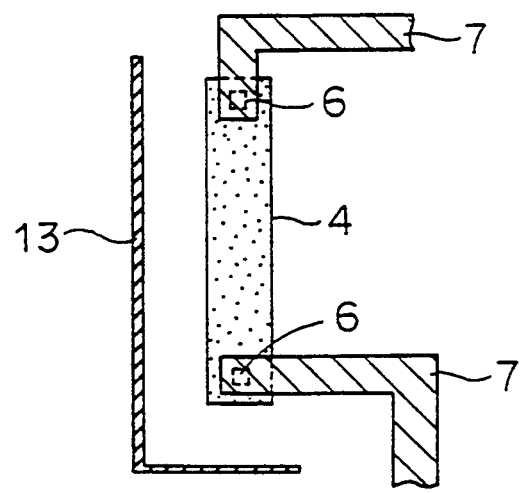
FIG. 13 is a schematic plan view showing a semiconductor pressure sensor according to a seventh embodiment of the present invention.

Referring to FIG. 13, a semiconductor pressure sensor according to a seventh embodiment of the present invention comprises an L-shaped linear seed 13 which is arranged along longer and shorter sides of each piezoresistance 4. In this case, it is possible to attain an effect similar to that of the semiconductor pressure sensor according to the fourth embodiment shown in FIG. 6. Namely, it is possible to reduce a distance for feeding a laser beam along the longitudinal direction of the piezoresistance 4 in laser recrystallization through the linear seed 13 serving as a seed crystal. Thus, it is possible to reduce the laser application time thereby reducing the step. Also as to the seventh embodiment, it is necessary to arrange such L-shaped linear seeds 13 on the same sides of respective piezoresistances 4, similarly to the sixth embodiment shown in FIG. 11.

Figure 14:
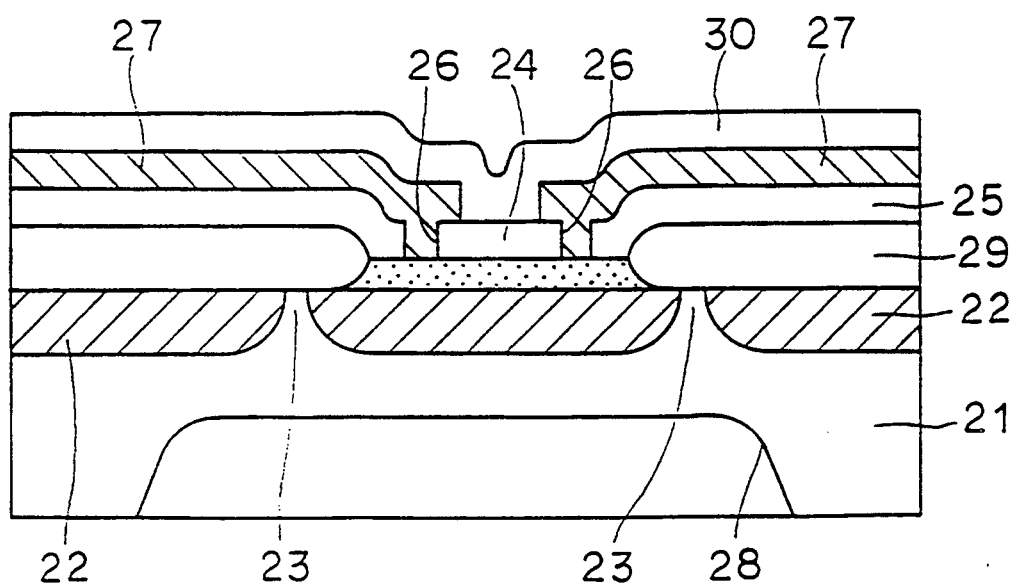
FIG. 14 is a sectional view showing a semiconductor pressure sensor according to an eighth embodiment of the present invention.

Referring to FIG. 14, a semiconductor pressure sensor according to an eighth embodiment of the present invention comprises a monocrystal silicon substrate 21, a silicon oxide film 22 of about 1.0 μm in thickness which is formed on a prescribed region of a major surface of the monocrystal silicon substrate 21 by thermal oxidation, seed regions (seed crystal regions) 23 which are formed on other regions of the major surface of the monocrystal silicon substrate 21 provided with no silicon oxide film 22, a piezoresistance 24, having piezo characteristics, which is formed on a prescribed region of the silicon oxide film 22, a LOCOS oxide film 29 of about 1.0 μm in thickness which is formed on the seed regions 23 and the silicon oxide film 22 to enclose the piezoresistance 24, an interlayer insulating film 25 of silicon oxide having a thickness of about 0.6 μm, which is formed on the piezoresistance 24 and the LOCOS oxide film 29 with a contact hole 26 provided on a prescribed region of the piezoresistance 24, interconnection layers 27 which are formed to be electrically connected to the piezoresistance 24 through the contact hole 26 and to extend along the interlayer insulating film 25, a protective film 30 of plasma nitride or silicon oxide which is formed to cover the interconnection layers 27 and the interlayer insulating film 25, and a diaphragm 28 which is formed on a back surface portion of the monocrystal silicon substrate 21 located under the piezoresistance 24.

In the semiconductor pressure sensor according to the eighth embodiment, the LOCOS oxide film 29 and the silicon oxide film 25 are interposed between the seed regions 23 and the interconnection layers 27, whereby the distances between the seed regions 23 and the interconnection layers 27 are increased by the thickness (1.0 μm) of the LOCOS oxide film 29 as compared with the prior art even if the plan positions of the seed regions 23 and the interconnection layers 27 are overlapped with each other. Thus, it is possible to improve withstand voltages across the seed regions 23 and the interconnection layers 27 as compared with the prior art. Further, the LOCOS oxide film 29 which is formed by thermal oxidation is superior in withstand voltage characteristics to the silicon oxide film 25 which is formed by CVD. Consequently, it is possible to remarkably improve the withstand voltages across the seed regions 23 and the interconnection layers 27 by the LOCOS oxide film 29. Although the plan positions of the seed regions 23 and the interconnection layers 27 are overlapped with each other in this embodiment, it is possible to further improve the withstand voltages across the seed regions 23 and the interconnection layers 27 when the plan positions thereof are not overlapped with each other, similarly to the first to seventh embodiments.

A method of fabricating the semiconductor pressure sensor according to the eighth embodiment of the present invention is now described with reference to FIGS. 14 to 19.

Figure 15:
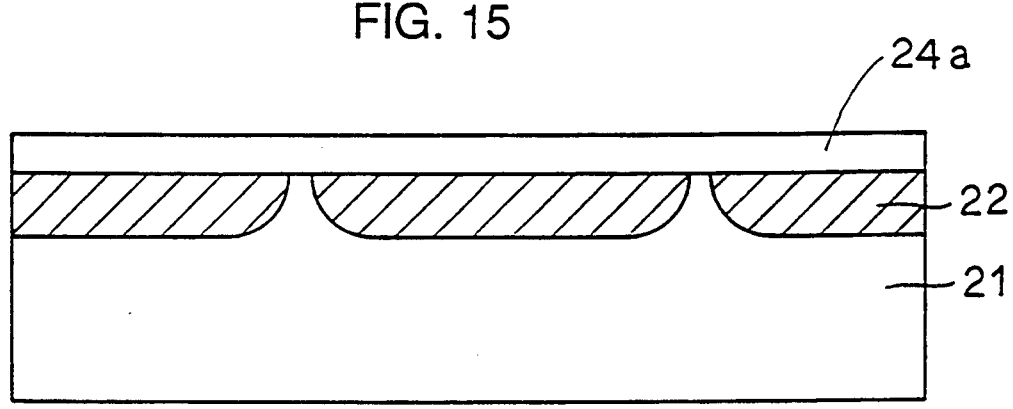
FIG. 15 is a sectional view for illustrating a first step in a process of fabricating the semiconductor pressure sensor according to the eighth embodiment shown in FIG. 14.

First, a silicon oxide film 22 is formed on a prescribed region of a major surface of a monocrystal semiconductor substrate 21, as shown in FIG. 15. Due to such formation of the silicon oxide film 22, seed regions 23 are also formed to serve as seed crystals for laser recrystallization. Then, monocrystals are laterally grown from the seed regions 23 on the silicon oxide film 22, to form a monocrystal silicon layer 24a.

Figure 16:
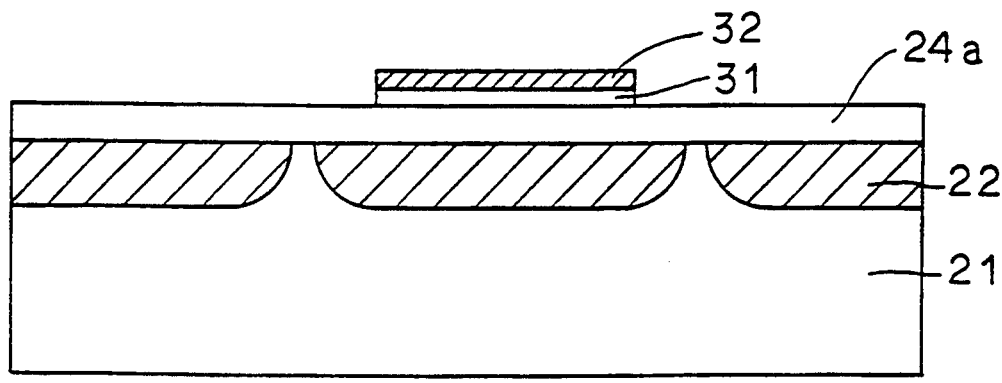
FIG. 16 is a sectional view for illustrating a second step in the process of fabricating the semiconductor pressure sensor according to the eighth embodiment shown in FIG. 14.

Then, a silicon oxide film 31 and a silicon nitride film 32 are formed on a prescribed region of the monocrystal silicon layer 24a, as shown in FIG. 16.

Figure 17:
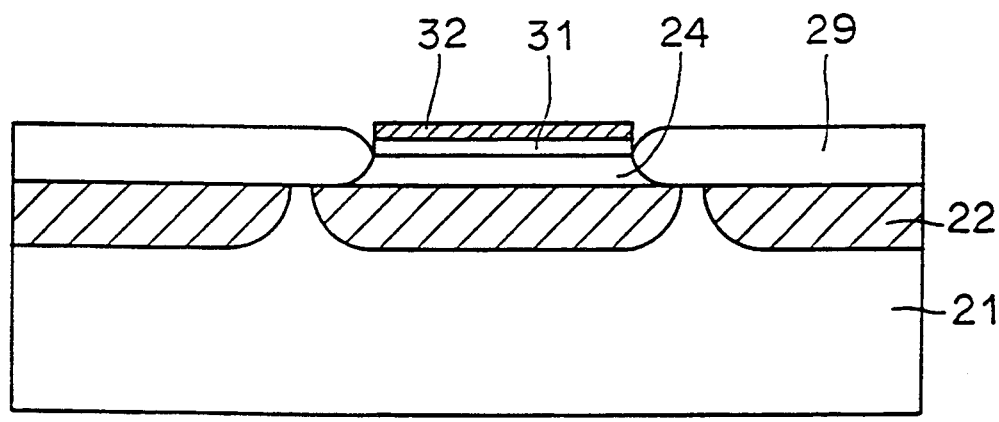
FIG. 17 is a sectional view for illustrating a third step in the process of fabricating the semiconductor pressure sensor according to the eighth embodiment shown in FIG. 14.
Figure 18:
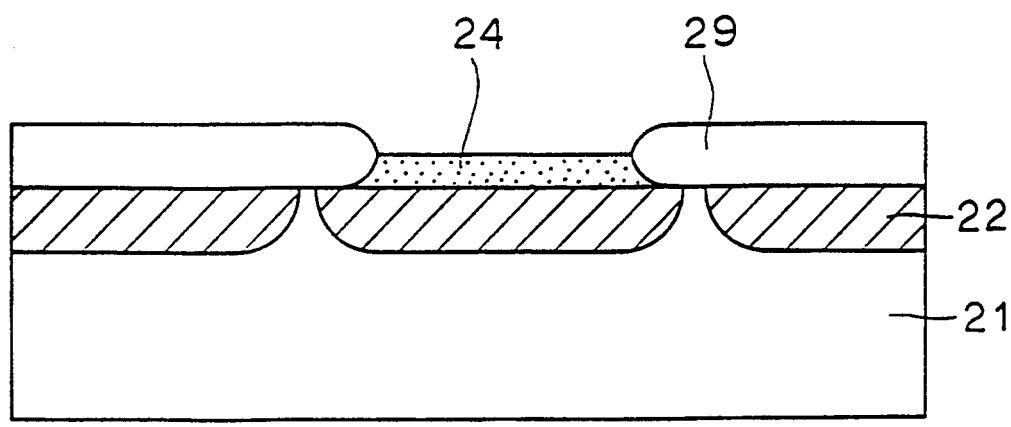
FIG. 18 is a sectional view for illustrating a fourth step in the process of fabricating the semiconductor pressure sensor according to the eighth embodiment shown in FIG. 14.

Then, the silicon oxide film 31 and the silicon nitride film 32 are used as masks to thermally oxidize the monocrystal silicon layer 24a by a LOCOS method, thereby forming a LOCOS oxide film 29, as shown in FIG. 17. Thereafter the silicon nitride film 32 and the silicon oxide film 31 are removed.

Figure 19:
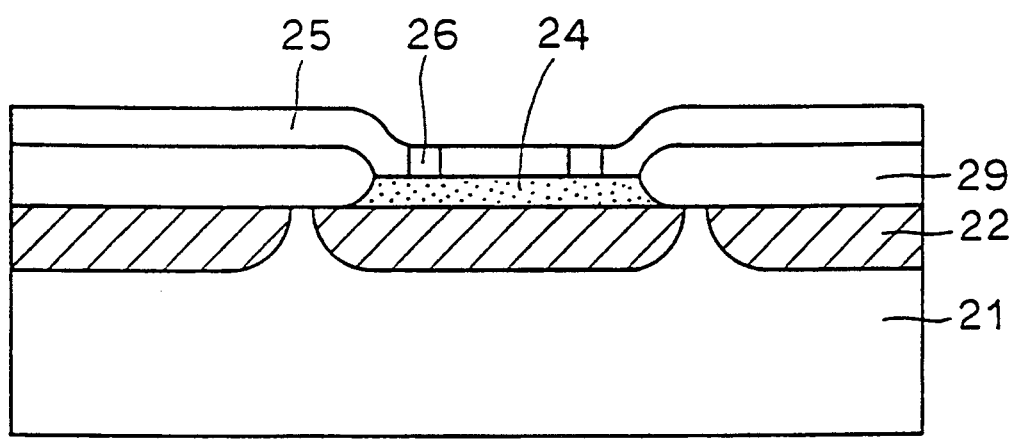
FIG. 19 is a sectional view for illustrating a fifth step in the process of fabricating the semiconductor pressure sensor according to the eighth embodiment shown in FIG. 14.

Then, an impurity is introduced into the monocrystal silicon layer 24a (see FIG. 17) enclosed by the LOCOS oxide film 29 to form a piezoresistance layer 24, as shown in FIG. 19.

Then, an interlayer insulating film 25 of silicon oxide having a thickness of about 0.6 μm is formed on the piezoresistance layer 24 and the LOCOS oxide film 29 by CVD, as shown in FIG. 19. A contact hole 26 is formed in a region of the interlayer insulating film 25 located on the piezoresistance layer 24.

Finally, interconnection layers 27 are formed to be electrically connected to the piezoresistance layer 24 and to extend along the interlayer insulating film 25, as shown in FIG. 14. A protective film 30 of plasma nitride or silicon oxide is formed to cover the interconnection layers 27 and the interlayer insulating film 25. Then, a diaphragm 28 is formed on a prescribed region of the back surface of the monocrystal silicon substrate 1. Thus, in the method of fabricating the semiconductor pressure sensor according to the eighth embodiment, a well-known step of forming the LOCOS oxide film 29 is simply added to the steps of fabricating the conventional semiconductor pressure sensor shown in FIG. 29, whereby it is possible to readily fabricate a semiconductor pressure sensor having excellent withstand voltage characteristics.

Figure 20:
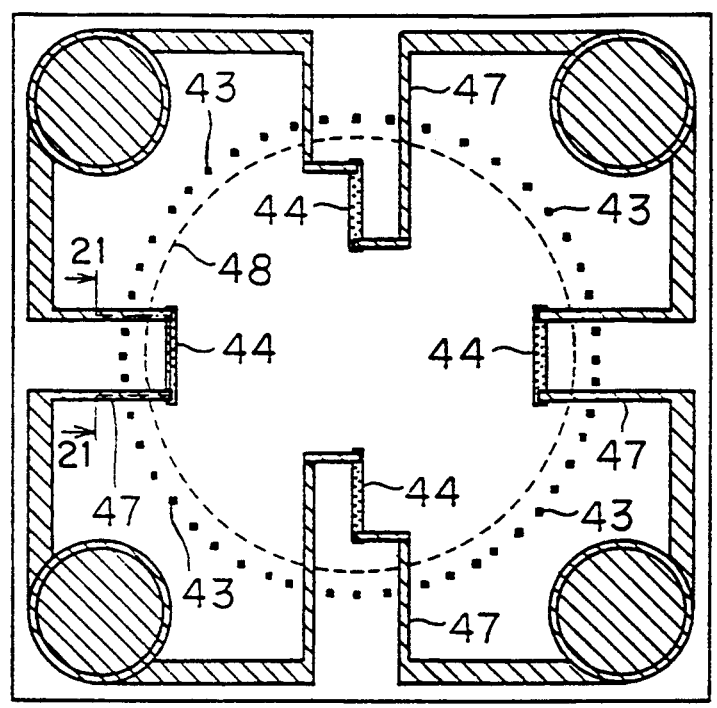
FIG. 20 is a general plan view showing a semiconductor pressure sensor according to a ninth embodiment of the present invention.
Figure 21:
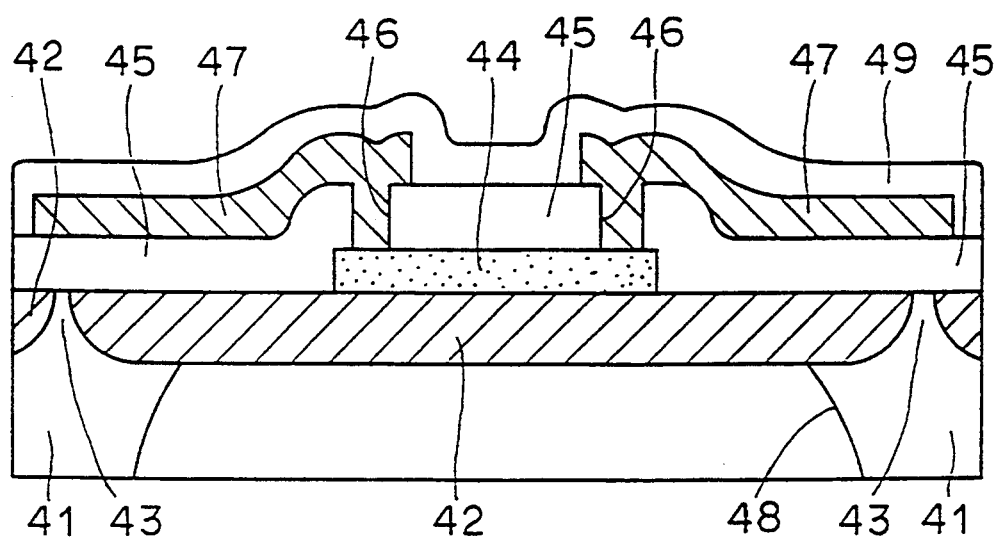
FIG. 21 is a sectional view, showing the semiconductor pressure sensor according to the ninth embodiment, taken along the line X—X in FIG. 20.

Referring to FIGS. 20 and 21, a semiconductor pressure sensor according to a ninth embodiment of the present invention comprises a monocrystal silicon substrate 41, a diaphragm 48 which is formed on the back surface of the monocrystal silicon substrate 41, a silicon oxide film 42 of about 1.0 μm in thickness which is formed by thermal oxidation on a major surface region of the monocrystal silicon substrate 41 located above the region provided with the diaphragm 48, dot seeds 43 which are formed on other regions of the major surface of the monocrystal silicon substrate 41 provided with no silicon oxide film 42 and outside the region provided with the diaphragm 48, piezoresistances 44 which are formed on prescribed regions of the silicon oxide films 42 located above the diaphragm 48, an interlayer insulating film 45 of silicon oxide having a thickness of about 0.6 μm which is formed to cover the piezoresistances 44 with contact holes 46 provided on the upper surfaces of the piezoresistances 44, interconnection layers 47 which are formed to be electrically connected to the piezoresistances 44 in the contact holes 46 and to extend along the interlayer insulating films 45, and a protective film 49 of silicon oxide or plasma nitride which is formed to cover the interconnection layers 47 and the interlayer insulating film 45.

According to the ninth embodiment, the dot seeds 43 are arranged on the regions outside the region provided with the diaphragm 48 along the outer periphery of the diaphragm 48, whereby silicon forming the dot seeds 43 is not scraped by etching for forming the diaphragm 48. Since the diaphragm 48 can be etched through the silicon oxide film 42 serving as an etching stopper, it is possible to form the diaphragm 48 as a homogeneous thin film. Further, it is possible to improve withstand voltages across the interconnection layers 47 and the dot seeds 43 by arranging the same so that plan positions thereof are not overlapped with each other, similarly to the first to seventh embodiments. The dot seeds 43 may be replaced by linear seeds.

Figure 22:
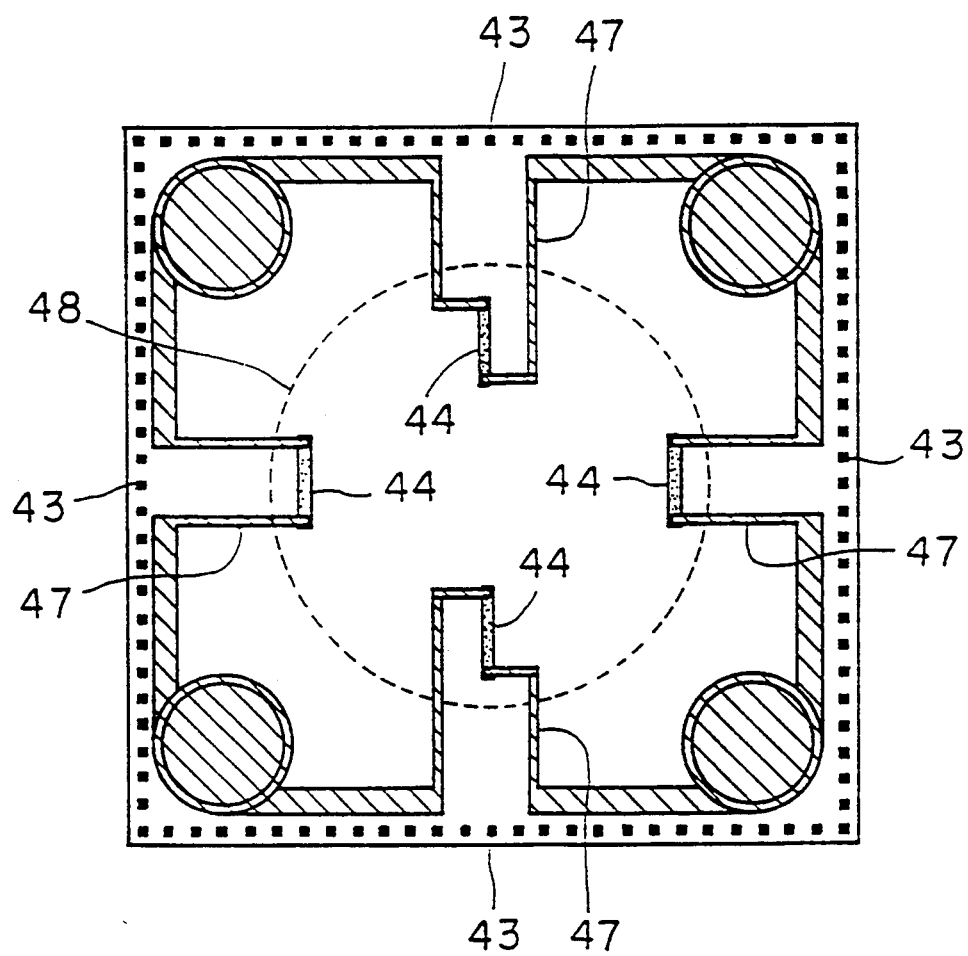
FIG. 22 is a general plan view showing a semiconductor pressure sensor according to a tenth embodiment of the present invention.

Referring to FIG. 22, a semiconductor pressure sensor according to a tenth embodiment of the present invention comprises dot seeds 43 which are arranged on regions outside interconnection layers 47. In this case, silicon forming the dot seeds 43 is not influenced by etching for forming a diaphragm 48 similarly to the ninth embodiment shown in FIG. 21, whereby it is possible to form the diaphragm 48 as a homogeneous thin film. According to the tenth embodiment, further, the dot seeds 43 are so completely separated from the interconnection layers 47 that withstand voltages across the same and the interconnection layers 47 can be improved. Also in the tenth embodiment, the dot seeds 43 may be replaced by linear seeds.

Figure 23:
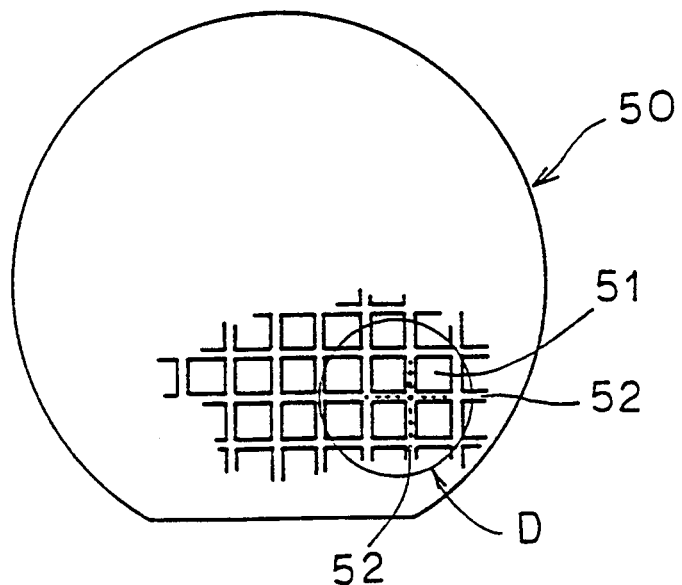
FIG. 23 is a plan view showing a semiconductor wafer including semiconductor pressure sensor chips according to an eleventh embodiment of the present invention.
Figure 24:
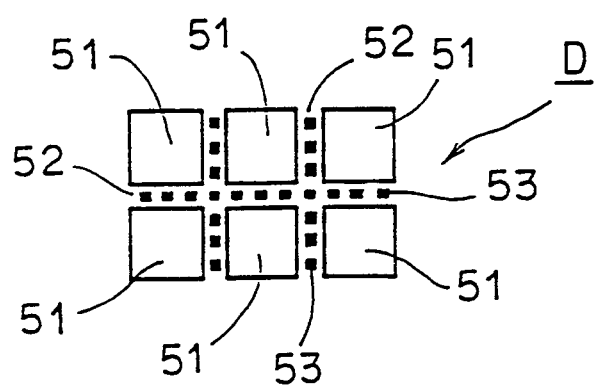
FIG. 24 is a partially enlarged sectional view showing a part D of the semiconductor wafer including the semiconductor pressure sensor chips according to the eleventh embodiment shown in FIG. 23.
Figure 25:
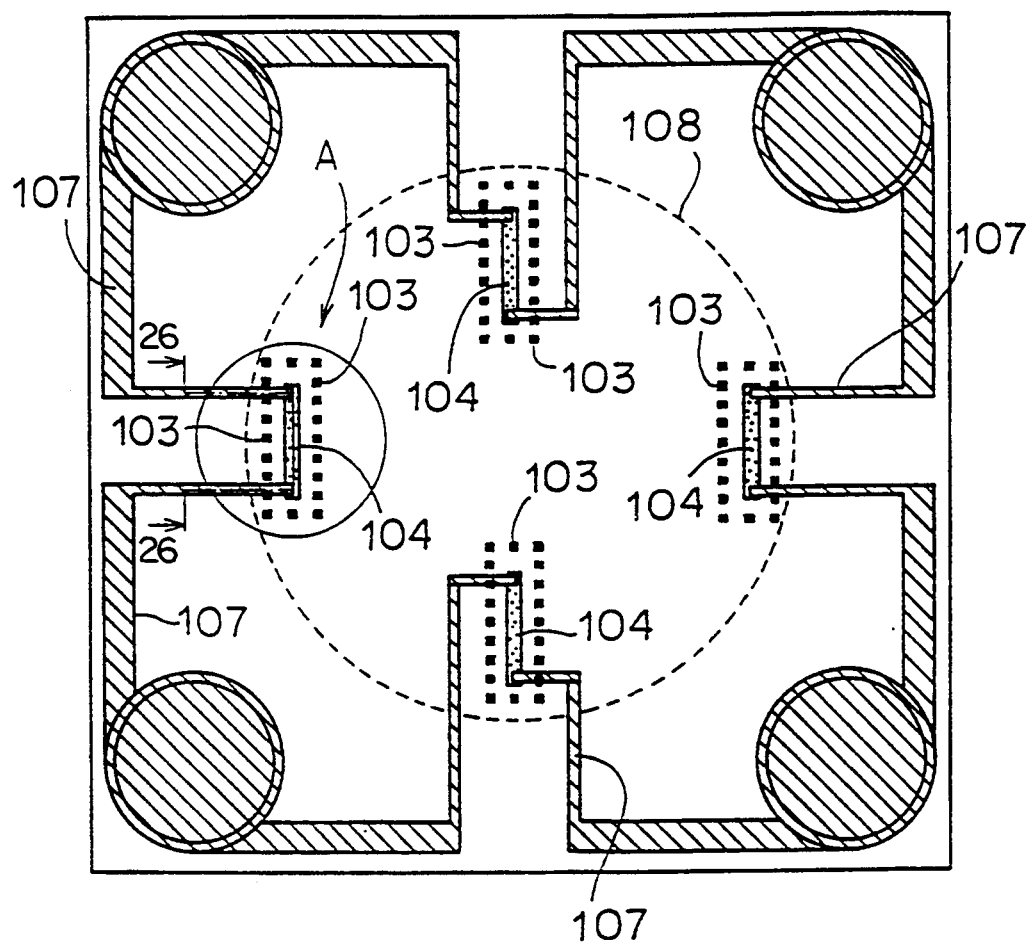
FIG. 25 is a general plan view showing a conventional semiconductor pressure sensor.

Referring to FIGS. 23 and 24 showing an eleventh embodiment of the present invention, dot seeds 53 are arranged on dicing lines 52 between a plurality of semiconductor pressure sensor chips 51 which are formed on a semiconductor wafer 50. Thus, silicon forming the dot seeds 53 is not influenced by etching for forming diaphragms similarly to the ninth and tenth embodiments, whereby it is possible to form the diaphragms as homogeneous thin films. Further, the dot seeds 53 are so completely separated from the interconnection layers (not shown) that withstand voltages across the same and the interconnection layers can be improved. In addition, the dot seeds 53 are effectively simultaneously removed when the semiconductor pressure sensor chips 51 are finally diced. Also in the eleventh embodiment, the dot seeds 53 may be replaced by linear seeds.

While each of the first to eleventh embodiments has been described with reference to a semiconductor pressure sensor having an SOI structure which is formed by laser recrystallization, the present invention is not restricted to this but is also applicable to a semiconductor pressure sensor having an SOI structure which is formed by EB (electron beam) recrystallization or lateral epitaxy, so far as the method employs the so-called lateral seeding of laterally growing a monocrystal from a seed (seed crystal) on an insulating layer.

Although each of the first, eighth, ninth embodiments has been described with reference to a semiconductor pressure sensor having silicon oxide films 2, 22, 42 formed by thermal oxidation, the present invention is not restricted to this but is also applicable to a semiconductor pressure sensor having a silicon oxide film formed by CVD method. In that case, it is necessary to form contact holes for seeding in the silicon oxide film (CVD oxide film) after forming the CVD oxide film. It is also necessary that the contact holes should be filled with a polycrystal silicon film (which is changed into a monocrystal silicon film by recrystallizing the polycrystal silicon film) formed on the CVD oxide film and the polycrystal silicon film should be connected to the seeds in the contact holes. The CVD oxide film has a thickness of about 1.0 μm–3.0 μm.

In the semiconductor pressure sensor according to an aspect of the present invention, as hereinabove described, the seed crystal regions are formed at prescribed intervals to enclose the piezoresistance layer and the interconnection layer is formed to pass through the clearance between adjacent ones of the seed crystal regions in plan position so that the plan positions of the interconnection layer and the seed crystal regions are not overlapped with each other, whereby linear distances between the seed crystal regions and the interconnection layer are increased as compared with the prior art. Thus, it is possible to improve withstand voltages across the interconnection layer and the seed crystal regions by virtue of the increased distances. Consequently, it is possible to improve the withstand voltage across the interconnection and piezoresistance layers and the monocrystal semiconductor substrate.

In the semiconductor pressure sensor according to another aspect of the present invention, the seed crystal region is formed on a prescribed region around the piezoresistance layer not to enclose the same so that the interconnection layer is arranged on the unenclosed region to be electrically connected to the piezoresistance layer, whereby plan positions of the seed crystal region and the interconnection layer are not overlapped with each other and a sufficient distance can be attained between the same. Thus, it is possible to extremely improve the withstand voltage across the seed crystal region and the interconnection layer. Consequently, it is possible to improve the withstand voltage across the interconnection and piezoresistance layers and the monocrystal semiconductor substrate.

In the semiconductor pressure sensor according to still another aspect of the present invention, the second insulating layer is formed on the seed crystal region and the first insulating layer to enclose the piezoresistance layer and the third insulating layer is formed on the second insulating layer and the piezoresistance layer while the interconnection layer is formed on the third insulating layer to be electrically connected to the piezoresistance layer, whereby the first and second insulating layers are interposed between the interconnection layer and the seed crystal region so that the insulation distance between the seed crystal region and the interconnection layer is increased as compared with the prior art by virtue of the second insulating layer. Thus, it is possible to improve the withstand voltage across the interconnection layer and the seed crystal region as compared with the prior art. Consequently, it is possible to improve the withstand voltage across the interconnection and piezoresistance layers and the monocrystal semiconductor substrate.

In the semiconductor pressure sensor according to a further aspect of the present invention, the seed crystal region is formed on a region of the front surface of the monocrystal semiconductor substrate provided with no first insulating layer and outside the region provided with the diaphragm, whereby the seed crystal region is not influenced by etching for forming the diaphragm and the first insulating layer serves as an etching stopper. Thus, it is possible to form a high-quality homogeneous diaphragm having a small thickness. Consequently, it is possible to obtain a semiconductor pressure sensor in high accuracy.

In the method of fabricating a semiconductor pressure sensor according to a further aspect of the present invention, the first insulating layer is formed on a prescribed region of the major surface of the monocrystal semiconductor substrate, the seed crystal region is formed on another region of the major surface of the monocrystal semiconductor substrate provided with no first insulating layer, the monocrystal layer is formed on the first insulating layer by laterally growing a monocrystal from the seed crystal region on the first insulating layer, the second insulating layer is formed by thermally oxidizing a prescribed region of the monocrystal layer, an impurity is introduced into a prescribed region of the monocrystal layer, the third insulating layer is formed on the monocrystal layer supplied with the impurity and the second insulating layer, and the interconnection layer is formed on the third insulating layer, whereby the second and third insulating layers are interposed between the interconnection layer and the seed crystal region so that it is possible to readily fabricate a semiconductor pressure sensor whose withstand voltage is improved as compared with the prior art by virtue of the second insulating layer.

What is claimed is:

1. A semiconductor pressure sensor comprising:
    a monocrystal semiconductor substrate having a major surface;
    a first insulating layer being formed on a prescribed region of said major surface of said monocrystal semiconductor substrate;
    a plurality of seed crystal regions being formed on other regions of said major surface of said monocrystal semiconductor substrate provided with no said first insulating layer;
    a piezoresistance layer prepared from a monocrystal layer being formed by laterally growing monocrystals from said seed crystal regions on said first insulating layer, said piezoresistance layer being provided on a prescribed region of said first insulating layer;
    a second insulating layer being formed to cover said piezoresistance layer and said first insulating layer, said second insulating layer having an opening on a prescribed region of said piezoresistance layer; and
    an interconnection layer being formed on said second insulating layer to be electrically connected to said piezoresistance layer through said opening,
    said seed crystal regions being formed at prescribed intervals to enclose said piezoresistance layer,
    said interconnection layer, in plan view, passing between and non-overlapping with adjacent said seed crystal regions, with a prescribed distance between said interconnection layer and each of the adjacent seed crystal regions.

2. A semiconductor pressure sensor in accordance with claim 1, wherein
    said first insulating layer comprises one selected from the group consisting of a thermal oxide film and a CVD oxide film, and
    said second insulating layer is a CVD oxide film.

3. A semiconductor pressure sensor in accordance with claim 1, wherein
    said first insulating layer is about 1.0–3.0 μm in thickness, and
    said second insulating layer is about 0.6 μm in thickness.

4. A semiconductor pressure sensor in accordance with claim 1, wherein
said seed crystal regions are formed to quadrangularly enclose said piezoresistance layer.

5. A semiconductor pressure sensor comprising:
a monocrystal semiconductor substrate having a major surface;
a first insulating layer being formed on a prescribed region of said major surface of said monocrystal semiconductor substrate;
a seed crystal region being formed on another region of said major surface of said monocrystal semiconductor substrate provided with no said first insulating layer;
a piezoresistance layer prepared from a monocrystal layer being formed by laterally growing a monocrystal from said seed crystal region on said first insulating layer, said piezoresistance layer being provided on a prescribed region of said first insulating layer;
a second insulating layer being formed to cover said piezoresistance layer and said first insulating layer, said second insulating layer having an opening on a prescribed region of said piezoresistance layer; and
an interconnection layer being formed on said second insulating layer to be electrically connected to said piezoresistance layer through said opening,
said seed crystal region being formed on a prescribed region around said piezoresistance layer not to enclose said piezoresistance layer,
said interconnection layer being formed on a region not enclosed by said seed crystal region.

6. A semiconductor pressure sensor in accordance with claim 5, wherein
said seed crystal region is arranged in the form of dots at prescribed intervals.

7. A semiconductor pressure sensor in accordance with claim 5, wherein
said seed crystal region is arranged in the form of a line.

8. A semiconductor pressure sensor in accordance with claim 5, wherein
said seed crystal region includes first and second seed crystal regions being formed to hold said piezoresistance layer along a current flow direction of said piezoresistance layer.

9. A semiconductor pressure sensor in accordance with claim 5, wherein
said seed crystal region is formed only on one side of said piezoresistance layer along a current flow direction of said piezoresistance layer.

10. A semiconductor pressure sensor in accordance with claim 5, wherein
said seed crystal region has an L shape which is formed by a first region arranged along a current flow direction of said piezoresistance layer and a second region arranged in a direction being substantially perpendicular to said first region.

11. A semiconductor pressure sensor in accordance with claim 5, wherein
said seed crystal region is formed on a region outside that provided with a diaphragm.

12. A semiconductor pressure sensor in accordance with claim 5, wherein
said seed crystal region is formed on a region outside said interconnection layer.

13. A semiconductor pressure sensor in accordance with claim 5, wherein
said seed crystal region is formed on a dicing line of a semiconductor wafer.

14. A semiconductor pressure sensor comprising:
a monocrystal semiconductor substrate having a major surface;
a first insulating layer being formed on a prescribed region of said major surface of said monocrystal semiconductor substrate;
a seed crystal region being formed on another region of said major surface of said monocrystal semiconductor substrate provided with no said first insulating layer;
a piezoresistance layer prepared from a monocrystal layer being formed by laterally growing a monocrystal from said seed crystal region on said first insulating layer, said piezoresistance layer being provided on a prescribed region of said first insulating layer;
a second insulating layer being formed on said seed crystal region and said first insulating layer to enclose said piezoresistance layer;
a third insulating layer being formed on said piezoresistance layer and said second insulating layer, said third insulating layer having an opening on a prescribed region of said piezoresistance layer; and
an interconnection layer being formed (i) on said second insulating layer to be electrically connected to said piezoresistance layer through said opening and (ii) so as to be non-overlapping with said seed crystal region in plan view.

15. A semiconductor pressure sensor in accordance with claim 14, wherein
said second insulating layer is a thermal oxide film.

16. A semiconductor pressure sensor in accordance with claim 14, wherein
said first insulating layer is about 1.0–3.0 $\mu$m in thickness,
said second insulating layer is about 1.0 $\mu$m in thickness, and
said third insulating layer is about 0.6 $\mu$m in thickness.

17. A semiconductor pressure sensor comprising;
a monocrystal semiconductor substrate having front and back surfaces;
a diaphragm being formed on a prescribed region of said back surface of said monocrystal semiconductor substrate;
a first insulating layer (i) being formed on said front surface of said monocrystal semiconductor substrate at least in a region corresponding to said region provided with said diaphragm and (ii) directly covering the top of said diaphragm;
a seed crystal region being formed on another region of said front surface of said monocrystal semiconductor substrate provided with no said first insulating layer, said another region being outside said region provided with said diaphragm;
a piezoresistance layer prepared from a monocrystal layer being formed by laterally growing a monocrystal from said seed crystal region on said first insulating layer, said piezoresistance layer being provided on said first insulating layer to be located above said region provided with said diaphragm;
a second insulating layer being formed to cover said piezoresistance layer and said first insulating layer, said second insulating layer having an opening on a prescribed region of said piezoresistance layer; and an interconnection layer being formed on said second insulating layer to be electrically connected to said piezoresistance layer through said opening.

18. A semiconductor pressure sensor in accordance with claim 17, wherein
   said seed crystal region is formed along the outer periphery of said region provided with said diaphragm.

19. A semiconductor pressure sensor comprising:
   a monocrystal semiconductor substrate having front and back surfaces;
   a diaphragm being formed on a prescribed region of said back surface of said monocrystal semiconductor substrate;
   a first insulating layer being formed on said front surface of said monocrystal semiconductor substrate at least in a region corresponding to said region provided with said diaphragm;
   a seed crystal region being formed on another region of said front surface of said monocrystal semiconductor substrate provided with no said first insulating layer, said another region being outside said region provided with said diaphragm;
   a piezoresistance layer prepared from a monocrystal layer being formed by laterally growing a monocrystal from said seed crystal region on said first insulating layer, said piezoresistance layer being provided on said first insulating layer to be located above said region provided with said diaphragm;
   a second insulating layer being formed to cover said piezoresistance layer and said first insulating layer, said second insulating layer having an opening on a prescribed region of said piezoresistance layer; and
   an interconnection layer being formed on said second insulating layer to be electrically connected to said piezoresistance layer through said opening;
   said seed crystal region is formed outside a region provided with said interconnection layer along the outermost periphery of said interconnection layer.

20. A semiconductor pressure sensor comprising:
   a monocrystal semiconductor substrate having front and back surfaces;
   a diaphragm being formed on a prescribed region of said back surface of said monocrystal semiconductor substrate;
   a first insulating layer being formed on said front surface of said monocrystal semiconductor substrate at least in a region corresponding to said region provided with said diaphragm;
   a seed crystal region being formed on another region of said front surface of said monocrystal semiconductor substrate provided with no said first insulating layer, said another region being outside said region provided with said diaphragm;
   a piezoresistance layer prepared from a monocrystal layer being formed by laterally forming a monocrystal from said seed crystal region on said first insulating layer, said piezoresistance layer being provided on said first insulating layer to be located above said region provided with said diaphragm;
   a second insulating layer being formed to cover said piezoresistance layer and said first insulating layer, said second insulating layer having an opening on a prescribed region of said piezoresistance layer; and
   an interconnection layer being formed on said second insulating layer to be electrically connected to said piezoresistance layer through said opening;
   said seed crystal region is formed on a dicing line.

21. A semiconductor pressure sensor in accordance with claim 17, wherein
   said interconnection layer region is formed to be non-overlapping with said seed crystal region in plan view.

* * * * *